(12) United States Patent
Mahyar et al.

(10) Patent No.: US 11,645,249 B1
(45) Date of Patent: May 9, 2023

(54) AUTOMATED DETECTION OF DUPLICATE CONTENT IN MEDIA ITEMS

(71) Applicant: Amazon Technologies, Inc., Seattle, WA (US)

(72) Inventors: Hooman Mahyar, Los Angeles, CA (US); Ryan Dall, Los Angeles, CA (US); Shubham Kansal, Culver City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 375 days.

(21) Appl. No.: 16/188,239

(22) Filed: Nov. 12, 2018

(51) Int. Cl.
| | | |
|---|---|---|
| *G06F 16/215* | (2019.01) | |
| *G06F 16/783* | (2019.01) | |
| *G06V 20/40* | (2022.01) | |
| *G06F 18/22* | (2023.01) | |

(52) U.S. Cl.
CPC .......... *G06F 16/215* (2019.01); *G06F 16/783* (2019.01); *G06F 18/22* (2023.01); *G06V 20/46* (2022.01); *G06V 20/48* (2022.01); *G06V 20/49* (2022.01)

(58) Field of Classification Search
CPC . G06F 16/215; G06F 16/783; G06K 9/00744; G06K 9/00758; G06K 9/00765; G06K 9/6215
See application file for complete search history.

(56) References Cited

U.S. PATENT DOCUMENTS

| | | | | |
|---|---|---|---|---|
| 2003/0004966 | A1* | 1/2003 | Bolle | G06F 16/735 |
| 2012/0239645 | A1* | 9/2012 | Li | G06F 16/50 |
| | | | | 707/727 |
| 2013/0039587 | A1* | 2/2013 | Zhang | G06K 9/00711 |
| | | | | 382/201 |
| 2013/0326573 | A1* | 12/2013 | Sharon | H04H 60/73 |
| | | | | 725/115 |
| 2014/0044355 | A1* | 2/2014 | Haritaoglu | G06F 16/7837 |
| | | | | 382/170 |
| 2017/0124400 | A1* | 5/2017 | Yehezkel Rohekar | G06K 9/52 |
| 2017/0270625 | A1* | 9/2017 | Kereth | G06Q 50/184 |
| 2020/0005048 | A1* | 1/2020 | Bharde | H04N 21/23418 |

FOREIGN PATENT DOCUMENTS

JP         2000123184 A  *  4/2000  ....... G06F 17/30802

* cited by examiner

*Primary Examiner* — Mark D Featherstone
*Assistant Examiner* — Samuel C Sharpless, III
(74) *Attorney, Agent, or Firm* — Lee & Hayes, P.C.

(57) ABSTRACT

This disclosure is directed to a system and method that detects duplicated content and/or media items. A media item can be split into media item portions. Based on the media item portions, features can be determined. Using the features, media item portion signatures can be determined to generate a media item signature. The media item signature can be compared with a different media item signature to determine duplicated content within the media items.

20 Claims, 10 Drawing Sheets

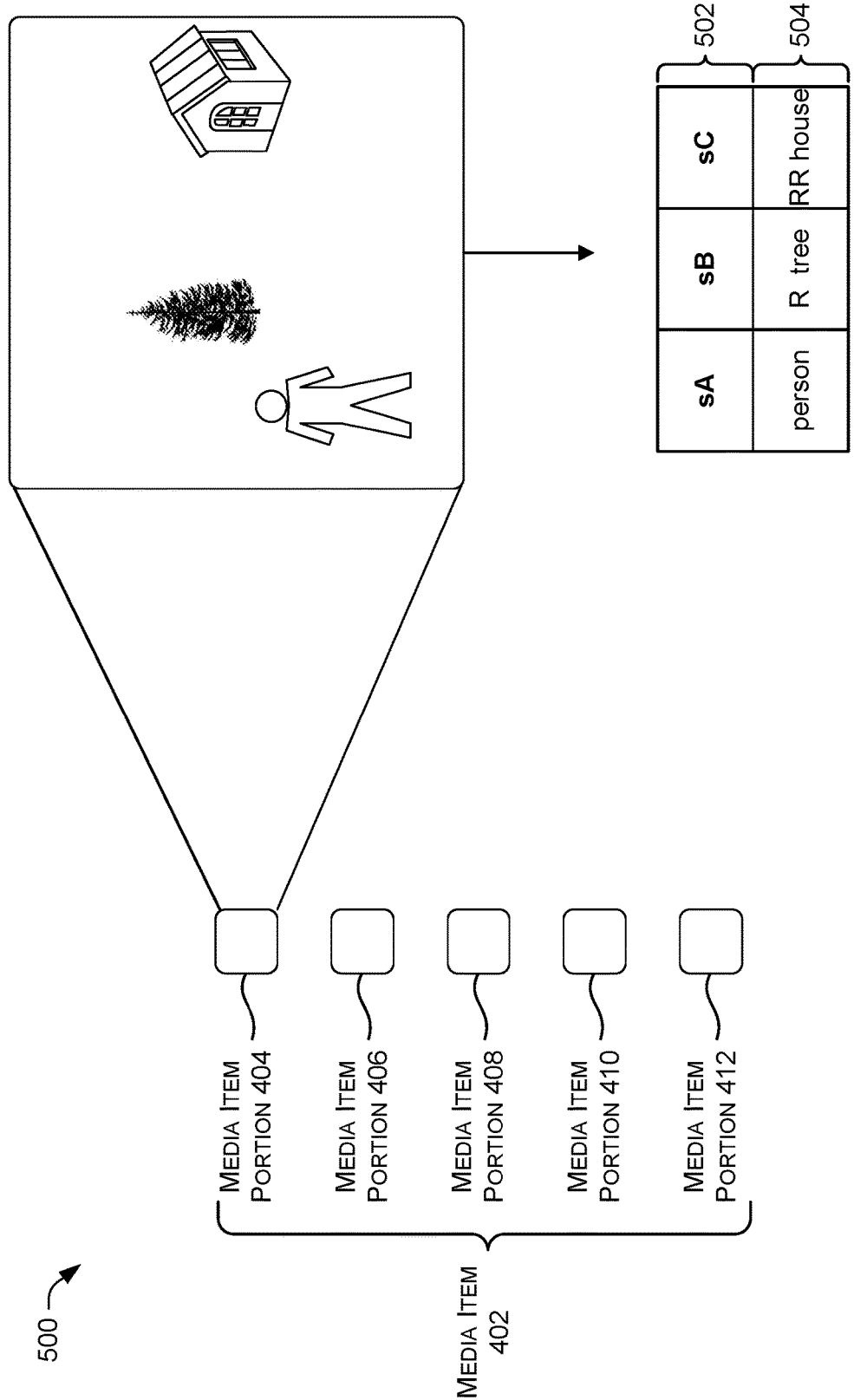

814 { {personA, R personB, RR tree, RR house}

816 { {personA, R personB, R  tree,  R  house}
        ⎵_____⎵  ⎵_____⎵
             818              820

FIG. 8B

AUTOMATED DETECTION OF DUPLICATE CONTENT IN MEDIA ITEMS

BACKGROUND

Media items can be uploaded to a database or a computing device for storage, for distribution, and/or as a search query. When uploaded for storage and/or distribution, the uploaded media item can already exist in the database or contain content from a different media item. Determining if an uploaded media item contains content from a different media item can help detect copyright infringement. When uploaded for a search query, a search can provide results that match the uploaded media item with other media items and allow users to identify a source. Determining whether an uploaded media item already exists in a database or determining a match for an uploaded media item can be a time-consuming task and/or consume a significant amount of resources.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 is a pictorial diagram of the illustrative media item illustrated in FIG. 4 and an illustrative media item portion and media item portion semantic features associated with the media item portion.

FIG. 8A is a pictorial diagram of the illustrative media item signature illustrated in FIG. 7A and a second media item signature.

FIG. 8B is a pictorial diagram of an illustrative media item semantic signature and a second media item semantic signature.

DETAILED DESCRIPTION

Figure 1:
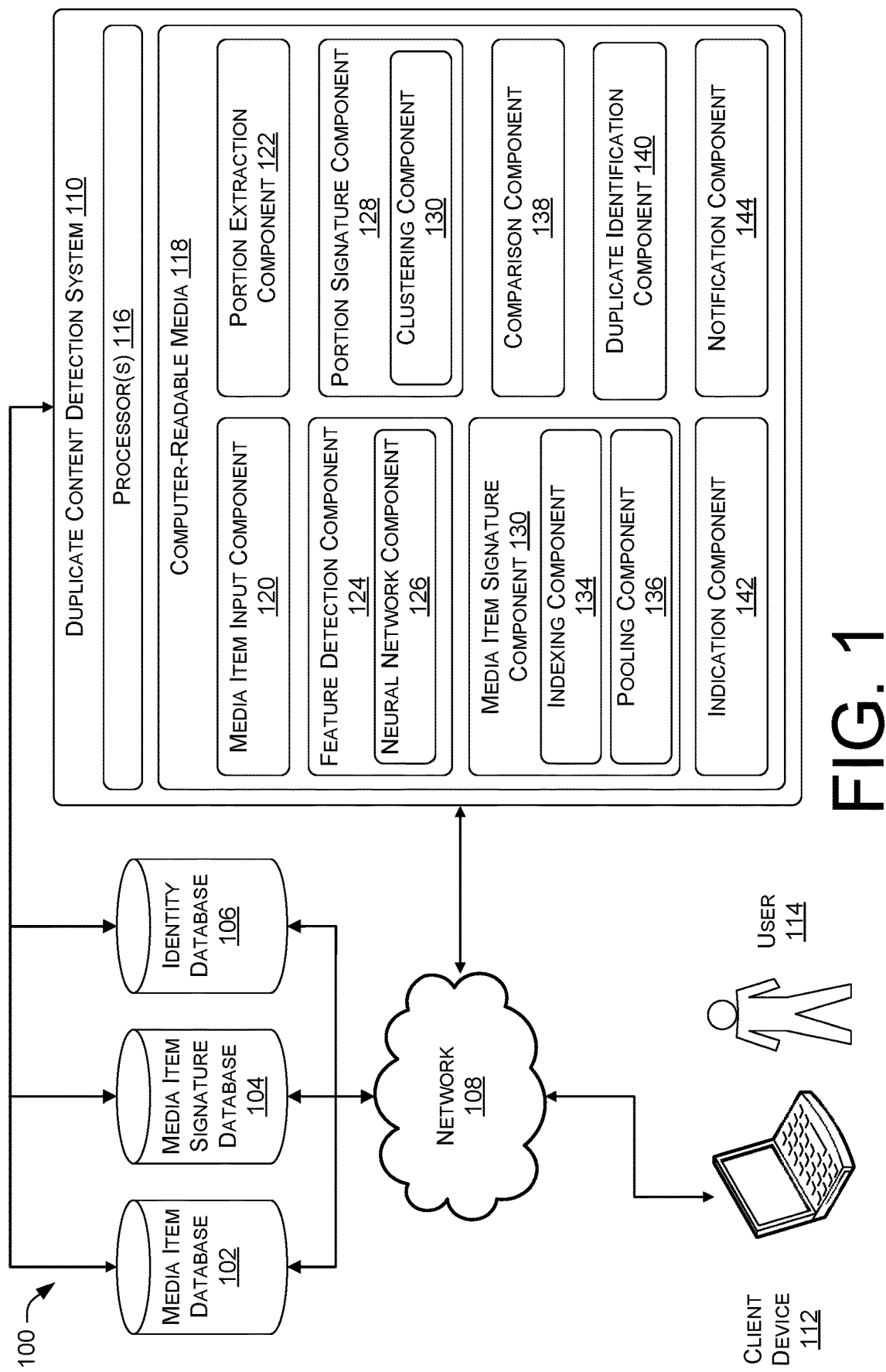
FIG. 1 is a system diagram of an illustrative environment that includes an illustrative computing architecture of a duplicate content detection system.

Content providers and/or users can upload media items for storage and/or distribution. For example, a producer of a film can upload the film to an online storage service and allow users to access the film through the online storage service. In some instances, the users can stream the film to a viewing device such as a television, a mobile device and/or a computer. In some instances, users can download the film and store it on a computing device. For purposes of illustration only, an independent producer of content can record a short film and upload the short film to an intermediate storage/distribution service. Users can then consume the short film by downloading and/or streaming the short film onto a mobile device.

Content providers and/or users can also upload media items as a search query. For example, a user can store an image library on a device and/or on an online storage service. The user can then store an additional image and determine if the additional image has already been stored or search for images with similar content. For purposes of illustration only, a user can have a printed photograph that the user would like to digitally store. After taking a digital photo of the printed photograph and storing it in an image library, the user can, at a later time, take another digital photo of the printed photograph to determine if the printed photograph has already been stored in the image library. In some instances, the user can use a photo to search a generic database of photos. For purposes of illustration only, a user can take a picture of a car and receive results of similar images associated with the same or similar cars.

In some instances, individuals may incorporate portions of a different media item into their own media item without first receiving permission from the individual/entity that owns, or at least controls access to, the different media item. Such actions may result in copyright infringement. To determine if a media item contains content that is associated with a different media item, the techniques disclosed herein operate by determining or extracting, from the media item, media item portions. For example, the media item can be a video. The video can be broken up (e.g., partitioned, divided, spliced, etc.) into media item portions, such as individual frames of the video. For purpose of illustration only, a video that has a runtime of five seconds can be broken up at a rate of one frame per second resulting in five media item portions. In some instances, the rate at which media item portions are determined can be at a different ratio or at a variable ratio (e.g., one frame per second for a first half of a video and two frames per second for a second half of the video). The media item can also be an audio recording. For example, a podcast can be broken up into media item portions where individual media item portions comprise audio for an amount/duration of time. For purpose of illustration only, an audio recording that has a runtime of 10 seconds can be broken up at a rate of one second per media item portion. In some instances, the rate at which media item portions are determined can be at a different ratio or at a variable ratio (e.g., one second per media item portion for a first third of the audio recording and two seconds per media item portion for the last two-thirds of the audio recording). Therefore, the media item portions can be broken up according to a fixed time interval or a variable time interval. The media item can also be a slide show, a set of images and/or photos, and/or a combination of video, audio, and/or photos. In some instances, when breaking up a media item into media item portions, timestamp data can be extracted and/or determined and associated with the different media item portions.

By breaking up or splitting a media item into media item portions, a system and/or method can analyze the media item with increased granularity. For purposes of illustration only, a media item can be associated with ten media item portions. Three of the ten media item portions can be content duplicated from, or that is similar to, a different media item. If the media item were not broken up into media item portions, a system might have more difficulty in determining the duplicated content, also referred to as similar content (e.g., similar, but not necessarily identical, content), because the entire media item is not duplicated. Analyzing media item portions allows the system to make a more granular inspection and identify potential duplicated content or similar content more accurately and efficiently.

A feature detection component can detect features from the media item portions. For example, a feature detection component can determine, from a media item portion, types of features such as colors, gradients, edges, audio frequencies, and/or text (e.g., low-level features), although other suitable features are also contemplated. Color features can represent colors shown in an image or a frame of a video. Gradient features can represent a change in a color over an area in an image or a frame of a video. Edge features can represent edges of objects in an image or a frame of a video. Audio frequency features can represent the frequencies of audio associated with a media item portion of an audio recording and/or of a video. Text features can represent text that is displayed on an image or a frame of a video. In some instances, text features can represent a portion of a text file that is associated with a portion of a media item (e.g., a subtitle data file). In some instances, these feature types can represent low-level features of media item portions, where the low-level features represent data without a corresponding meaning, in contrast to semantic or high-level features described below.

The feature detection component can also detect semantic features (e.g., high-level features) from the media item portions. For example, a feature detection component can determine, from a media item portion, semantic features such as object data, facial data, identity data, and/or language data, although other suitable semantic features are contemplated. Object data can represent objects depicted in an image or a frame of a video. Facial data can represent faces depicted in an image or a frame of a video. Identity data can represent the identities of individuals in a media item portion. Language data can represent languages in a media item portion, such as a language of written text or a language of words spoken during the media item portion. For purposes of illustration, a media item portion can comprise multiple frames of a video that includes a vehicle and an actor/actress talking on a phone. The object data can indicate that a vehicle is depicted in the media item portion and the make and model of the vehicle. The facial data can indicate a face of the actor/actress. The identity data can indicate the identity of the actor/actress and can indicate a name and possibly other biographical data. The language data can indicate the language used by the actor/actress and the meaning of the spoken words (e.g., indicate that the character asked a question about what to have for lunch). If sub-titles or other text is depicted in the media item portion, the language of the text may be identified. In some instances, the low-level features can be used to detect the semantic features. For purposes of illustration only, a media item portion can be a frame of a video and the low-level features can indicate a blue color across an upper half of the frame. These low-level features can be used and the feature detection component can determine a semantic feature such as blue sky and associate the blue sky with the frame. As another example for purposes of illustration only, a media item portion can be an audio clip of an audio recording containing spoken words and the low-level features can represent audio frequency data. Using the audio frequency data, the feature detection component can determine a semantic feature such as the words associated with the audio frequency data.

In some instances, the feature detection component can determine the identity (e.g., a person's name) using the facial features and based on one or more facial recognition techniques or algorithms. For example, the feature detection component can determine facial features from a media item portion. The feature detection component can then access an identity database to determine if an identity can be associated with the facial features. In some instances, facial features as well as other data can be used to determine an identity such as a title of the media item. In some instances, audio frequency data can be used to match with a person's voice recording stored in an identity database.

The feature detection component can use machine learning algorithms, statistical algorithms, and/or probabilistic models to detect the features (e.g., low-level features and/or high-level features). In some instances, the feature detection component can use a neural network component to detect the features. A neural network component can include a deep neural network to operate on the media item portions to detect the features. For example, neural networks such as Visual Geometry Group (i.e., VGG), Residual Network (i.e., ResNet), GoogleNet, Zeiler & Fergus Net (i.e., ZFNet), and AlexNet can be used, although other suitable neural networks are also contemplated. In some instances, the neural network component can perform localization to determine a location of an object in an image and in other instances, the neural networks can perform classification to determine a type of object in the image. Through multiple layers of processing, such as convolutions layers, max pooling layers, and/or fully connected layers, the neural network can calculate a probability and/or a likelihood distribution for an object and/or features in a given image or media item portion.

The neural network component can be trained to detect features from the media item portions. The training, for example, can include applying optimization algorithms (e.g., Gradient Descent, Stochastic Gradient Descent, or Adam) to optimize weights applied to layers within the neural network. Known inputs can be used to assist the training process. For example, an image of a chair can be used to train the neural network and the weights can be adjusted based on the probabilities associated with the classifications output by the neural network.

After detecting the features, the features can be represented as a numerical value or a set of numerical values and associated with a feature type. For example, a media item portion can be an image and the feature detection component can process the image as a set of pixels where each pixel is associated with a numerical pixel value or a set of numerical value (e.g., a red value, a green value, and a blue value). By performing operations such as addition, subtraction, division, and/or multiplication among pixel values, the pixels can be correlated and associated with one another to detect the features and associate the features with a feature type. For example, a feature can be a numerical value representing a color and can be associated with a color feature type. In some instances, a feature can be a numerical value representing an object and can be associated with an object feature type. In some instances, the media item portion can be an audio clip and the feature detection component can process the audio clip as a series of audio frequencies (e.g., represented in Hertz) and amplitudes to represent the audio clip, both as numerical values and, in some instances, associate it with an audio feature type. In some instances, the features such as semantic features can be represented as a plain text. For purposes of illustration only, if an actor named "John Doe" is identified and associated with a media item portion, the feature can be represented as the text "John Doe." In some instances, the features such as semantic features can be encoded into a numeric value.

Detecting features and representing the features numerically allows for a system and/or method to determine identifying aspects of a media item portion in an efficient manner. For example, a media item portion can be an image and the image can be represented in a binary form of a particular image file format (e.g., JPEG). Comparing a JPEG file to a different JPEG file would be an inefficient mechanism to identify similar content due to the computing resources and storage required to perform such operations. Features can represent identifying features without necessarily representing every individual pixel of an image.

A media item portion signature can be generated based on the features, or a numerical value, or a set of numerical values, associated with the features. For example, the media item portion signature can be generated by concatenating a set numerical values associated with a feature(s). For purposes of illustration only, a media item can be a video and a portion of the video can be a frame that contains a blue sky in an upper portion of the frame and a tree in a lower portion of the frame. The feature detection component can determine that the upper portion of the frame contains features such as blue pixels and that the lower portion of the frame contains features such as green and brown pixels. A signature can be generated by concatenating the numerical values of the blue, green, and brown pixels.

The feature detection component can also determine semantic signatures and determine that the upper portion of the frame contains a semantic feature of a sky and that the lower portion of the frame contains a semantic feature of a tree. The semantic features can be concatenated to generate a media item portion semantic signature (e.g., {sky,tree}). In some instances, the media item portion signature and the media item portion semantic signature can be combined into a single signature. In some instances, the media item portion signature and the media item portion semantic signature can be encoded into a numeric value.

One or more clustering techniques can also be used to determine the media item portion signatures. For example, a media item database can store one or more media items. As discussed above, the one or more media items of the media item database can be broken up or split up into media item portions and associated with media item portion signatures. A clustering algorithm can be used to associate media item portions having similar features into clusters and determine media item portion signatures associated with the clusters. For example, media item portions that have (or are associated with) features that meet or exceed a media item portion similarity threshold (or fall below a media item portion variance threshold) can be placed within or associated with the same cluster. In some instances, the media item portion similarity threshold can be a visual similarity, an audio similarity, a textual similarity, or any other similarity based on the features associated with the media item portions. For purposes of illustration only, one or more media item portions can be associated with a cluster that has a cluster signature: {9,1,0,8}. An incoming media item can have a media item portion that is associated with the cluster. Then, instead of generating or calculating a media item portion signature for the media item portion, the media item portion can be associated with the cluster signature {9,1,0,8}. Generating the clusters can include using a nearest neighbor search such as, for example, k-nearest neighbor, k-means clusters, approximate nearest neighbor algorithms, or exact nearest neighbor algorithms, although other suitable clustering algorithms are also contemplated. In some instances, after generating the clusters, clusters that meet or exceed a cluster similarity threshold can be merged to create a merged cluster. This can help reduce the amount of data and/or computing resources required to maintain a large number of clusters.

After determining the media item portion signatures and/or the media item portion semantic signatures, a media item signature can be determined. For example, a media item can be broken into a set of media item portions. For the set of media item portions, features associated with feature types (e.g., colors, gradients, edges, audio frequencies, and/or text) and/or semantic features can be determined and a set of media item portion signatures and/or semantic signatures can be determined. The media item signature can be represented as a concatenation of the set of media item portion signatures, a concatenation of a set of media item portion types, and/or a concatenation of semantic signatures. For purposes of illustration only, a media item can be a video and can be broken into three frames. Each frame can have a media item portion signature that includes a concatenation of features represented as numerical values such as:

Media item portion signature #1: {0, 1, 5, 8, 2}
Media item portion signature #2: {6, 3, 8, 5, 1}
Media item portion signature #3: {9, 7, 1, 2, 3}.

As discussed above, the features can be associated with a feature type. For purposes of illustration only, the features in media item portion signatures can be associated with color feature types red, orange, yellow, green, and, blue. A media item signature can be represented as a concatenation of the three media item portion signatures represented as:

Media item signature: {{0, 1, 5, 8, 2}, {6, 3, 8, 5, 1}, {9, 7, 1, 2, 3}}

In some instances, the media item signature can be generated using an indexing technique or a pooling technique. As discussed above, the feature detection component can, in some instances using a neural network, calculate a probability and/or a likelihood for determining objects and/or features in a media item portion. An indexing component can use the probability/likelihood and select for each media item portion a feature with the highest probability or that meets or exceeds a feature threshold. For purposes of illustration only, the media item portion signatures can include or be associated with the probability and/or likelihood for each feature as:

Media item portion signature #1: {0-10%, 1-25%, 5-5%, 8-90%, 2-50%}
Media item portion signature #2: {6-5%, 3-10%, 8-15%, 5-5%, 1-85%}
Media item portion signature #3: {9-95%, 7-30%, 1-25%, 2-70%, 3-20%}.

Then, an indexing component can select the highest probability associated with a feature value for each media item and concatenate the feature values to represent the media item signature as:

Media item signature: {8, 1, 9}

Therefore, the media item signature can include a numeric value representing a feature or features associated with each media item portion. In some instances, the indexing component can select the feature with the maximum value or a high value that meets or exceeds a feature threshold from the signatures. In some instances, the indexing component can select features from a subset of the available media item portion signatures rather than from each media item portion signature.

In some instances, the indexing component can select the feature type associated with the feature with the maximum value or the high value that meets or exceeds the feature threshold from the media item portion signatures. For example, the features in the media item portion signatures can be associated with the feature types as:

Media item portion signature #1: {0—red, 1—orange, 5—yellow, 8—green, 2—blue}

Media item portion signature #2: {6—red, 3—orange, 8—yellow, 5—green, 1—blue}

Media item portion signature #3: {9—red, 7—orange, 1—yellow, 2—green, 3—blue}.

Thus, for purposes of illustration only, for the media item signature {8, 1, 9}, the numerical value of 8 can be associated with the green color feature type, the numerical value of 1 can be associated with the blue color feature type, and the numerical value of 9 can be associated with the red color feature type. Then the resulting media item signature can be represented as:

Media item signature: {green, blue, red}.

Similar to the indexing component, a pooling component can use the probability likelihood and select for each type of feature, a feature with the highest probability or that meets or exceeds a feature threshold. For example, a media item portion signature can include five features represented numerically where each of the five features is associated with a feature type. In some instances, a feature type can be a color, an audio frequency, and/or a gradient. In some instances, a feature type can be an object, a face, and/or an identity. Other types of features and semantic features are contemplated. For purposes of illustration only, using the same media item portion signatures from above, a pooling component can concatenate the highest probability associated with each feature type and concatenate the feature values to represent the media item signature as:

Media item signature: {9, 7, 1, 8, 1}

Therefore, the media item signature can include a numeric value representing a feature or features associated with each feature type. In some instances, the pooling component can select the feature with the maximum value or a high value that meets or exceeds a feature threshold associated with a feature type from the signatures. In some instances, the pooling component can select features from a subset of the available feature types in the media item portion signatures rather than from each feature type.

Using an indexed media item signature and/or a pooled media item signature can, in some instances, reduce the amount computing resources (e.g., processing resources, power resources, storage resources, network resources) by reducing the amount of data in a media item signature. In some instances, the media item signature can be a combination of a full concatenation of media item portion signatures, an indexed media item signature, and/or a pooled media item signature. In some instances, the types of media item signatures used can be based on the media item type (e.g., a video, an audio recording, an image, and/or a slide show).

A comparison can be made using the media item signature with a different media item signature. For example, a first media item can have a first media item signature and a second media item can have a second media item signature. Comparing the first media item signature with the second media item signature can generate a similarity value. For purposes of illustration only, a first media item signature and a second media item signature can be represented as:

First media item signature: {9, 7, 1, 8, 1}

Second media item signature: {9, 7, 1, 5, 5}

A similarity value can be determined using multiple techniques. For example, the first media item signature and the second media item signature can have a similarity value of 60% (or 0.6) because three of the five feature values match with one another. In some instances, the similarity value can be determined on a per feature basis (e.g., {100%, 100%, 100%, 62.5%, 20%} where 62.5% (or 0.625) is calculated from [5/8*100] and 20% (or 0.20) is calculated from [1/5*100]). Other techniques for calculating the similarity value are contemplated.

In some instances, a comparison can be made using a media item signature with a full concatenation of media item portion signatures, an indexed media item signature, and/or a pooled media item signature. In some instances, a weight can be assigned to one or some of the media item signatures (i.e., a full concatenation of media item portion signatures, an indexed media item signature, a pooled media item signature). The weight can represent a significance. For example, an indexed media item signature can be assigned a weight of zero resulting in the indexed media item signature comparison having zero contribution to the similarity value. For purposes of illustration only, a pooled media item signature can be assigned a weight of 65%, an indexed media item signature can be assigned a weight of 30% and a full concatenation of media item portion signatures can be assigned a weight of 5%. This can result in three similarity values having different weights. In some instances, the weight(s) can be based on a type of media item being analyzed (e.g., a video, an audio recording, an image, and/or a slide show). In some instances, the weight can be based on the content of the media item (e.g., an animated film, a live-action film, etc.).

Using the similarity value(s), a similarity threshold (also referred to herein as a similarity threshold value) can indicate duplicated or similar content between a first media item and a second media item. For example, a similarity threshold can be set at a value and if the similarity value(s) meets or exceeds the similarity threshold, then the systems and/or methods can identify or determine that the first media item and the second media item share or have duplicated content or similar content. For purposes of illustration only, the similarity threshold can be configured to be 50%. If a media item signature has a 50% similarity (i.e., half of the media item portion signatures match a different media item portion's signatures) or more, then the systems and/or methods can determine that the media items share duplicated content or similar content.

The systems and methods described can be performed to review uploaded content as a part of a pre-publishing review process. For example, a distributor of content can receive media items from a variety of sources. Some of the sources can include, for example, video clips of copyrighted content. In order to maintain high standards and/or to ensure that an individual/entity is not using media items without consent, permission, or authorization, the distributer can review the content using the techniques described herein. In some instances, the sources can include images of trademarked content. Similarly, in order to maintain high standards and/or to ensure that an individual/entity is not using media times without consent, permission, or authorization, the distributor can review the content using the techniques described herein as, for example, a part of a trademark clearance search.

In some instances, the systems and methods can be used to determine duplicated or similar content as a media item is being uploaded. For example, a content provider can produce a film that contains copyrighted content. As the content provider is uploading the film through a user interface for storage and/or distribution, the techniques described herein can determine that at least a portion of the media item contains the duplicate or similar content and generate a notification of the potential copyright violation on the user interface. In some instances, a media capturing device (e.g., a video recorder, a camera, and/or an audio recorder) can be registered as a professional device. The media capturing device can be configured to execute the systems and methods described herein and detect the duplicate or similar content as well as a potential copyright violation as the media is being captured. Then a notification can be generated for the user of the media capturing device notifying the user of the potential copyright infringement.

The systems and methods described can also be used to perform semantic searching of content. For example, a user can enter a text-based search query for "Jane Doe wearing a hat." The techniques described can use the search query and search for media items, such as videos, associated with Jane Doe wearing a hat. In some instances, a user can take a picture of a scene to search for media items that have similar features. For example, a user can take a picture of a dinosaur and receive results for dinosaur-related content such as photos, films, or television episodes. In some instances, the user can receive time stamps identifying a beginning and/or an ending time stamp associated with the content identified by the search.

FIG. 1 is a system diagram of an illustrative environment 100 that includes a media item database 102, a media item signature database 104, an identity database 106, a network 108, and an illustrative computer architecture of a duplicate content detection system 110. The environment 100 also can include a client device 112 associated with a user 114. The media item database 102 can store media items including, but not limited to, videos (e.g., television shows/episodes, motion pictures/movies/films, and/or individually created content such as home videos or cell phone videos), audio recordings (e.g., podcasts, audiobooks, and/or voice recordings/memos), and/or photos. In some instances, the media items can be a part of a regularly occurring series such as a television series or a weekly podcast. In other instances, the media items can be a part of a non-regularly occurring series such as a set of motion pictures.

The media item signature database 104 can store media item signatures associated with the media items stored in the media item database 102. For example, the media item database 102 can be a storage of media items maintained by a first entity and the media item signature database 104 can be maintained by a second entity, and therefore separate. In some instances, the media item database 102 and the media item signature database 104 can be placed in the same database or within one another. In some instances, the media item signature database 104 can store clusters of media item portions associated with the media items stored in the media item database 102. In some instances, the media item signature database 104 can store the cluster signatures associated with the clusters of media item portions.

The identity database 106 can store an identity or identities of an individual or individuals. For example, the identity database 106 can maintain the names (or other identifying information) of individuals and/or store biographical data (e.g., age, birthplace, etc.). In some instances, the identity database 106 can store images associated with the individuals and/or audio recordings associated with the individuals. For example, the identity database 106 can store video files or image files that depict an actor (e.g., videos of an interview with the actor, headshots of the actor, etc.) and/or audio files that correspond to recorded speeches or spoken words of the actor. In some instances, the identity database 106 can store title information associated with the individuals. For purposes of illustration only, the identity database 106 can store a name "John Doe," a photo of John Doe, a unique identifier that represents a user, such as a set of numbers, characters, symbols, etc., and/or titles that John Doe has appeared in, such as films and/or television episodes.

As depicted in FIG. 1, the media item database 102, the media item signature database 104, and the identity database 106 can connect directly to one another without the use of the network 108 or through a network 108. Additionally, the media item database 102, the media item signature database 104, and the identity database 106 can connect directly to the duplicate content detection system 110 without the use of the network 108 or through a network 108. The duplicate content detection system 110 can also be placed within the media item database 102, the media item signature database 104, and/or the identity database 106 or vice versa. These examples show how a variety of architectures could be used to implement these systems.

The static content detection system 108 can be implemented in a distributed or non-distributed computing environment. For example, some of the components can be distributed across multiple computing platforms or all of the components can be consolidated onto a single computing platform. Additionally, some of the components can be duplicated and implemented in parallel.

The duplicate content detection system 110 can include one or more processors 116 and one or more computer readable media 118 that stores various modules, applications, programs, or other data. The computer-readable media 118 can also include instructions, that when executed by the one or more processors 116, cause the one or more processors 116 to perform the operations described herein for the duplicate content detection system 110. In some instances, the processor(s) 116 can include a central processing unit (CPU), a graphics processing unit (GPU), both a CPU and a GPU, or other processing units or components known in the art. Additionally, each of the processor(s) 116 can possess its own local memory, which also may store program modules, program data, and/or one or more operating systems.

The computer-readable media 118 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 118 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The media item database 102 can transmit a media item to the media item input component 120 directly or via the network 108. For example, the media item input component 120 can receive the media item. In some instances, the media item input component 120 can determine which media item to retrieve and then the media item input component 120 can retrieve the media item. For example, the media item input component 120 can select a media item based on consumption data indicating a number of users that have consumed, or are currently consuming, a media item. In some instances, the duplicate content detection system 110 can access the media item without the media item input component 120, for example, by having the media item stored within the computer-readable media 118 or, for example, by having the duplicate content detection system 110 operate within the media item database 102, the media item signature database 104, and/or the identity database 106. In some instances, the media item input component 120 can receive the media item from client device 112. For example, a user 114 can capture or select a media item on client device 112 and transmit the media item to the duplicate content detection system 110 through the network 108 where the media item input component 120 can then receive the media item. The client device 112 can represent computing devices such as mobile phones, laptop computers, electronic book (eBook) reader devices, tablet computers, wearable devices (e.g., smart watches, activity trackers, etc.), smart televisions, smart appliances, desktop computers, servers, and/or workstations.

The portion extraction component 122 can perform portion extraction on a variety of types of media. For example, the portions can include one or more frames of a video. In some instances, the portions can include audio clips of an audio recording such as a podcast. In some instances, the media item can include a mixed type (i.e., a media item including both video and audio), and the portion extraction component 122 can extract the video portion, the audio portion, or both from the media item and extract portions from the extracted video portion and/or the extracted audio portion. The portion extraction component 122 can also extract time data and associate a time with each of the media item portions. In some instances, the portion extraction component 122 can determine time data based on an extraction rate. For example, if media item portions are extracted at a rate of one frame per second of a video, the portion extraction component can determine that the fifth frame is associated with a fifth second of the video. The portion extraction component 122 can also adjust the size of the media item portion using, for example, a configuration setting. For example, a single media item portion can include a single frame of the video or multiple frames of the video. In some instances, a single media item portion can include a fraction of a second of audio or multiple seconds of audio. By adjusting the size of the media item portions, a performance of a computer can be improved by reducing an amount of data required for processing or the iterations required to process a media item. Therefore, a computing system can operate faster, more efficiently, and/or with more accuracy.

The size of the media item portions can also be based on the size or length of the media item or the type of media item. For example, the size of the media item portions can be smaller for a shorter video, or a shorter audio recording, in order to have more granularity. In some instances, the size of the media item portions can be smaller or larger regardless of the size or length of the media item. The size or length of the media item portions can change or adjust dynamically, based on a configuration, based on machine-learning algorithms, and/or based on metadata or indications associated with the media item. For example, a media item can be associated with metadata or a tag that indicates that certain parts or segments of the media item can be ignored. A performance of a computer can also be improved by dynamically adjusting the size of the media item portions. The dynamic adjustment can allow a computing system to operate more efficiently by processing fewer media item portions and/or more accurately by concentrating on regions of a media item more likely to contain duplicate content or by ignoring segments of the media item.

The feature detection component 118 can detect a plurality of features from the media item portions. For example, features can include data such as color data, object data, audio frequency data, text data, and/or data indicating a correlation between pixels. In some instances, a media item portion can be a frame of a video and the frame can depict a color or a plurality of colors. For example, a color that meets or exceeds a color threshold can become a representative color of the color data. In some instances, a frame of a video can depict objects, such as a car or a building. Audio frequency data can include data associated with a media item portion. For example, an audio recording can be split into one or more media item portions and a media item portion can contain, for example, an audio clip. The audio clip can be represented as an audio frequency or a set of audio frequencies. Text data can comprise the text associated with a media item portion of a media item that has been transcribed. In some instances, the text data can comprise numerals. For example, the media item portion can contain spoken words where the spoken words can be transcribed into text. Then the text can be represented as a feature associated with that media item portion of the media item. In some instances, text data can comprise text and/or characters of a language that is displayed or shown visually on a media item portion of a video. Data indication a correlation between pixels can comprise, for example, X and Y coordinates for a set of pixels and, in some instances, can be used to detect edges within an image.

The feature detection component 118 can use data representing features and represent the features as numerical values. For example, the numerical values can include numbers with a range of 0-4096. In some instances, the range can include larger and/or smaller numerical values. After detecting the features, the feature detection component 118 can associate the detected features with the media item portion. For example, the feature detection component 118 can cause an association between the detected features and the media item portion to be stored in a database, a data structure, etc. In some instances, the feature detection component 118 can transcribe audio recordings into text and generate or determine transcriptions, using, for example, one or more automated speech recognition (ASR) techniques. Then, feature detection component 118 can detect portions of the text as the features associated with the media item portions.

As discussed above, the feature detection component 124 can use machine-learning algorithms, statistical algorithms, and/or probabilistic models to detect and/or determine features. In some instances, the feature detection component can use a neural network component 126 to detect the features. As discussed above, the neural network component 126 can include a deep neural network to operate on the media item portions to detect the features and any suitable neural is contemplated. In some instances, the neural network component 126 can perform localization to determine a location of an object in an image and in other instances, the neural networks can perform classification to determine a type of object in the image and, in some instances, can calculate a probability and/or a likelihood distribution for an object and/or features in a given image or media item portion. Therefore, as discussed above, the feature detection component 124 can determine low-level features (e.g., color, gradient, edges, etc.) as well as determine semantic or high-level features (e.g., objects, faces, identities, and/or languages).

The portion signature component 128 can generate a media item portion signature or a plurality/set of media item portion signatures based on the features detected by the feature detection component 124. As discussed above, the features can be represented as numerical values. Using these numerical values, a media item portion signature can be generated by using, in some instances, a concatenation of the numerical values of some or all of the features in a media item portion. In other instances, the signature can comprise a matrix or matrices of the numerical values or data arrays, data stacks, and/or data trees, although other suitable data structures are also contemplated. The media item portion signature generated by the portion signature component 128 can include a list of features or a concatenated set of features. In some instances, a sequence of numerical values can represent the media item portion signature. The signature component 128 can then associate the generated media item portion signature with the media item portion.

In some instances, the portion signature component 128 can use a clustering component 130 to determine a media item portion signature. The clustering component 136 can cluster the media item portions into clusters within the media item database 102 and use the cluster signatures associated with the clusters as the media item portion signatures. In some instances, the cluster signatures can be generated using techniques such as an indexing technique or a pooling technique described below. In some instances, the cluster signature can be a concatenation of the features of other media item portions associated with the cluster.

The media item signature component 132 can generate a media item signature based on the media item portion signatures generated by the portion signature component 128. As discussed above, the media item signature component 132 can generate and/or determine different types of media signatures including a concatenation of the media item portion signatures generated by the portion signature component 128.

In some instances, the media item signature component 132 can use the indexing component 134 to generate an indexed media item signature. The indexing component 132 can determine a feature from a media item portion signature where the feature is the numerically largest feature from the signature or a high value feature that meets or exceeds a feature threshold. The indexing component 132 can do this for some or all of the media item portion signatures and concatenate the features to generate the indexed media item signature. Therefore, the resulting indexed media item signature would not contain more than one feature from the same media item signature.

In some instances, the media item signature component 132 can use the pooling component 136 to generate a pooled media item signature. The pooling component 132 can determine the numerically largest feature or a high value feature above a feature threshold for each feature type and concatenate the features to generate the pooled media item signature. Therefore, the resulting pooled media item signature can, in some instances, contain more than one feature from the same media item signature but would not contain more than one feature associated with the same feature type.

The comparison component 138 can use the media item signature generated by the media item signature component 132 and compare it with a second media item signature. For example, the comparison component 138 can access the media item signature database 104 to retrieve the second media item signature. In some instances, the media item signature database 104 can transmit the second media item signature to the comparison component 138. As discussed above, the comparison component 138 can compare two media item signatures and generate a similarity value. The similarity value numerically represents a similarity between the two media item signatures. By representing the similarity numerically, the duplicate identification component 140 can more easily make comparisons using the similarity value. In some instances, the comparison component 138 can use techniques such as Levenshtein Distances or Longest Common Substrings. Other techniques such as Euclidean distance, Jaccard index, Manhattan distance, and/or Hunt-McIlroy algorithms can be used, although other suitable techniques are contemplated.

The duplicate identification component 140 can use the similarity value generated by the comparison component 138 to identify duplicate content. For example, the duplicate identification component 140 can use a similarity threshold. If the similarity value meets or exceeds the similarity threshold, then the duplicate identification component 140 can determine that two media items have shared or duplicate content.

In some instances, the comparison component 138 can determine duplicated content without the duplicate identification component 140. For example, the comparison component 138 can compare media item signatures and determine that some or all of the media item signatures are similar or substantially similar and determine that duplicated content exists or is shared between the media items without generating a similarity value.

The indication component 142 can generate an indication of the duplicate content and associate the indication with the media item. For example, after receiving a media item, the duplicate identification component 140 can determine that the media item contains duplicate content. Then, the indication component 142 can associate an indication of the duplicate content with the media item at the media item database 102. In some instances, the media item signature can be transmitted and stored in the media item signature database 104 and the indication can be stored with the media item signature. In some instances, the indication can also indicate a timestamp associated with a beginning and/or an end of the duplicated content in the media item.

The notification component 144 can generate a notification identifying the indication of the duplicated content and transmit the notification to a media item source. For example, the notification can be an e-mail, SMS message, and/or a data message. In some instances, after generating the notification, the notification can be transmitted to a producer and/or a content provider of the media item. In some instances, the notification can be transmitted to a client device 112 associated with a user 114.

As discussed above, the duplicate content detection system 110 can be a part of a larger system that provides additional computing resources such as, without limitation, a network interface controller. The network interface controller can interface with the network 108. In other instances, the static content detection system 110 can include functionality to interface with the network 110 directly.

Figure 2:
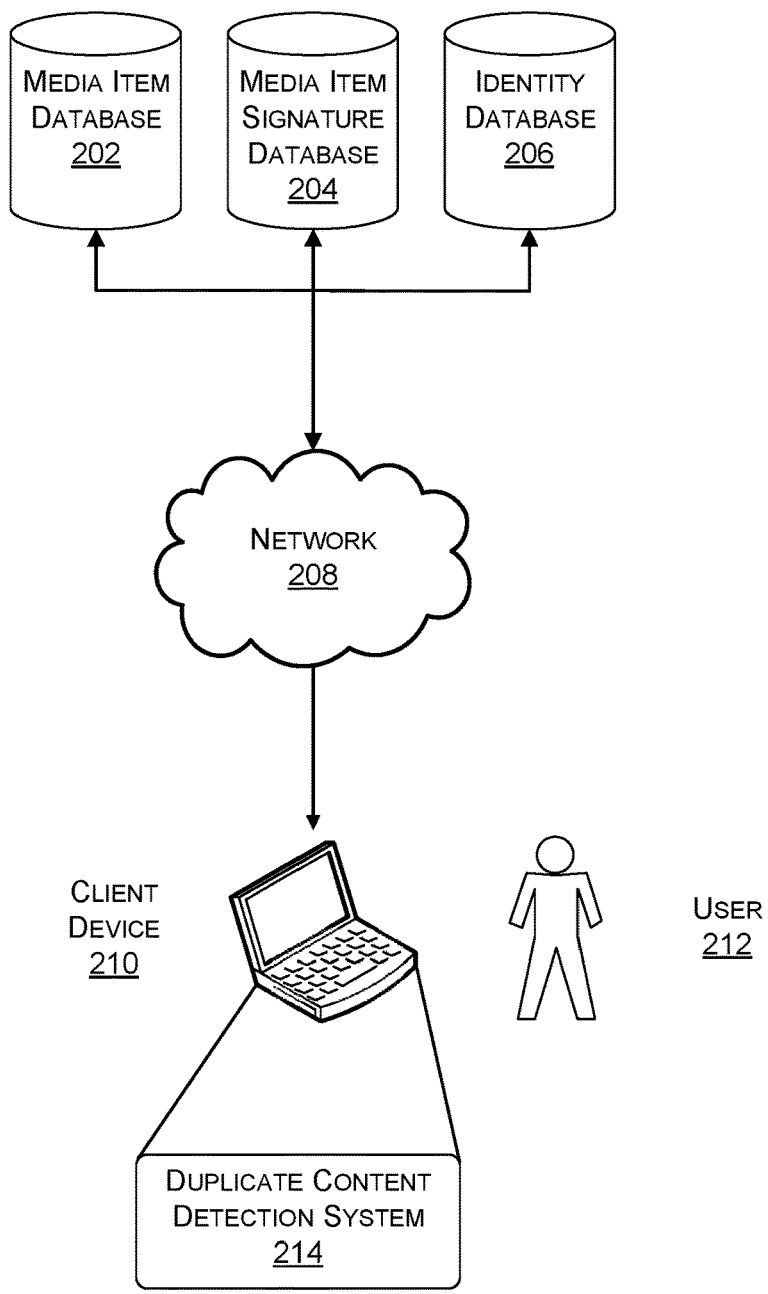
FIG. 2 is a system diagram of an illustrative environment that includes an illustrative duplicate content detection system on a client device.

FIG. 2 is a system diagram of an illustrative environment 200 that includes a media item database 202, a media item signature database 204, an identity database 206, a network 208, a client device 210, a user 212, and a static content detection system 214. The elements of FIG. 2 can be substantially similar to the elements of FIG. 1 that share the same name. Environment 200 depicts an example environment where the duplicate content detection system 214 can operate on the client device 210. For example, a user 212 can have a media item stored on the client device 210. The duplicate content detection system 214 can access the media item signature database 204 and the identity database 206 through network 208 to determine if the media item has duplicate content.

Figure 3:
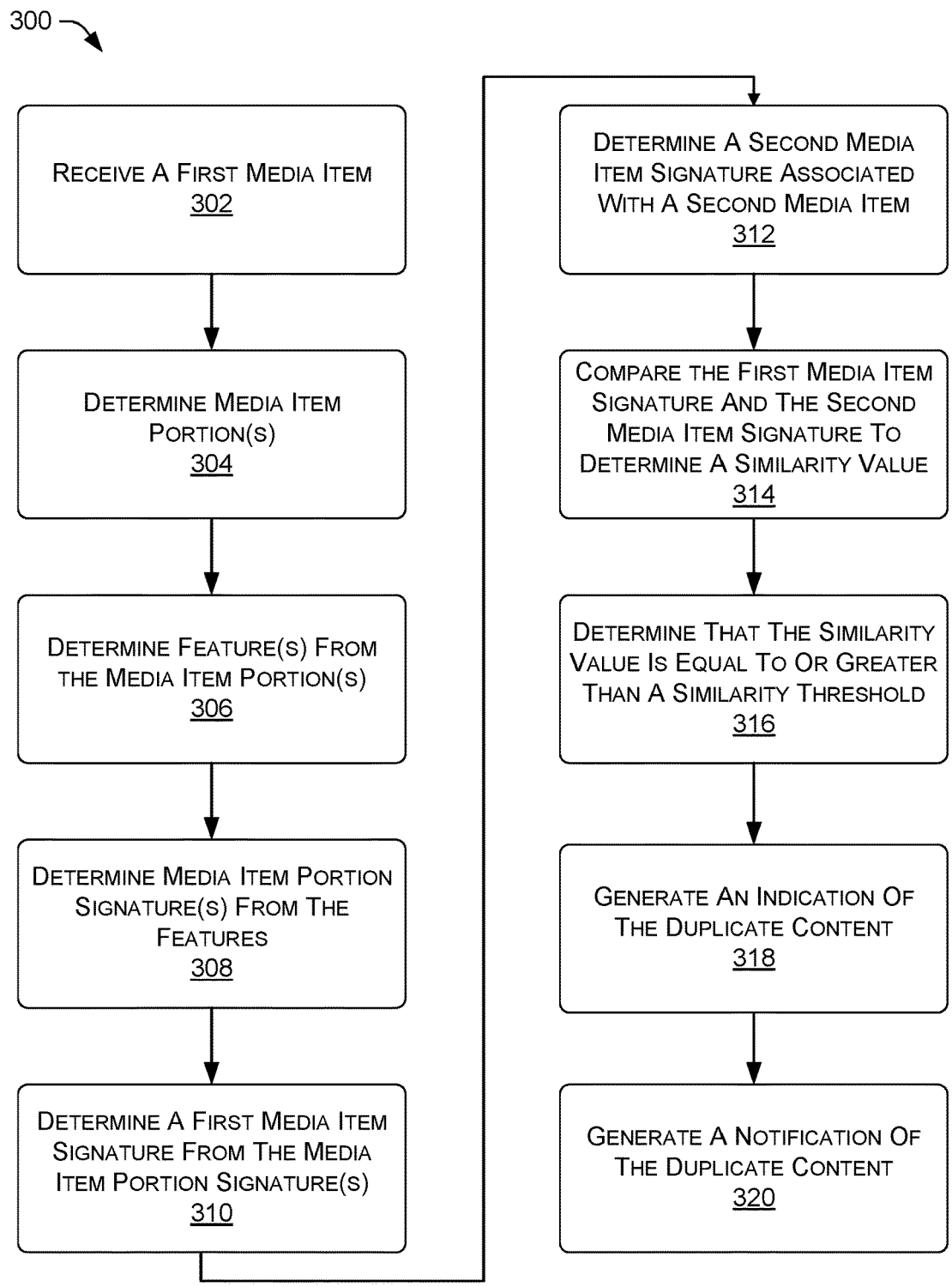
FIG. 3 is a flow diagram of an illustrative process to determine duplicate content.

FIG. 3 is a flow diagram of an illustrative process 300 to determine duplicate content contained within or associated with a media item. The process 300 is described with reference to the environment 100 and the duplicate content detection system 110. The process 300 can be performed in similar and/or different environments. Additionally, some portions of process 300 can be omitted, replaced, and/or reordered while still providing the functionality of determining duplicated content.

At 302, the media item input component 120 can receive a first media item. As discussed above, in some instances, the media item input component 120 can retrieve the first media item. The media item input component 120 can receive and/or retrieve the first media item from a media item database 102 directly and/or through a network 108. In some instances, the duplicate content detection system 110 may already store, or at least have access to, the first media item, or the media item may be received from a third party.

At 304, the portion extraction component 122 can determine media item portions from the first media item. For example, provided that the first media item is a video, the portion extraction component 122 can extract frames from the video. In some instances, if the first media item is an audio recording, the portion extraction component 122 can extract audio clips from the audio recording. In some instances, assuming that the first media item is a slide show, the portion extraction component 122 can extract photos from the slide show. In some instances, provided that the first media item is a written work, the portion extraction component 122 can extract text from the written work.

At 306, the feature detection component 124 can detect features from the media item portions. As discussed above, in some instances, the feature detection component 124 can use the neural network component 126 to detect the features in the media item portions. In some instances, the features can be represented as numerical values. In some instances, the features can be semantic features.

At 308, the portion signature component 128 can use the features detected by the feature detection component 122 to generate media item portion signatures. As discussed above, a media item portion signature can be a concatenation of numerical values. In some instances, the signature can be a data structure comprising and/or derived from the features. In some instances, some or all of the media item portions can have an associated media item portion signature. In some instances, the media item portion signature can be a semantic signature.

At 310, the media item signature component 132 can determine a first media item signature from the media item portion signature(s) determined by the portion signature component 128, where the first media item signature is associated with the first media item. In some instances, the first media item signature can be a concatenation of all of the media item portion signatures. In some instances, the first media item signature can be an indexed media item signature and/or a pooled media item signature. In some instances, the first media item signature can be a combination of some or all of the types of media item signatures discussed herein.

At 312, the process 300 can determine a second media item signature associated with a second media item, where the second media item is different than the first media item. As discussed above, the comparison component 138 can access the media item signature database 104 to retrieve and/or receive the second media item signature. In other embodiments, the duplicate content detection system 110 may maintain, or at least have access to, the second media item and/or second media item signature.

At 314, the comparison component 138 can determine a similarity value between the first media item signature and the second media item signature. As discussed above, in some instances, the similarity value can be calculated based on a similarity of the media item signatures as a whole. In some instances, the similarity value can be determined based on a comparison between the numerical values of the individual features within the media item signatures.

At 316, the duplicate identification component 140 can determine that the similarity value meets or exceeds a similarity threshold. If the similarity meets or exceeds the similarity threshold, the duplicate identification component 140 may determine that the first media item contains duplicate content with respect to the second media item. Otherwise, the duplicate content detection system 110 may determine that the first media item and the second media item do not contain duplicate content. If the first media item and the second media item contain some duplicate content, it may be determined that the first media item and the second media item do not contain a threshold amount of duplicate content.

At 318, the indication component 142 can generate an indication of the duplicate content and associate the indication with the first media item and/or the second media item. In some instances, the indication component 142 can associate a beginning and/or an end timestamp with the duplicate content. The duration, amount, or extent of the duplicate content can be determined from the beginning/end timestamps of the duplicate content and can be associated with the first media item and/or the second media item.

At 320, the notification component 144 can generate a notification identifying the duplicate content and transmit the notification to a source of the first media item and/or the second media item. As a result, an individual/entity associated with the first media item and/or the second media item may become aware, or at least be notified of, the duplicate content.

FIGS. 4-8B are pictorial diagrams of an illustrative process of detecting duplicate content within a media item. This example will step through a portion of the process by which the duplicate content is detected. The order in which the operations are described is not intended to be construed as a limitation, however.

Figure 4:
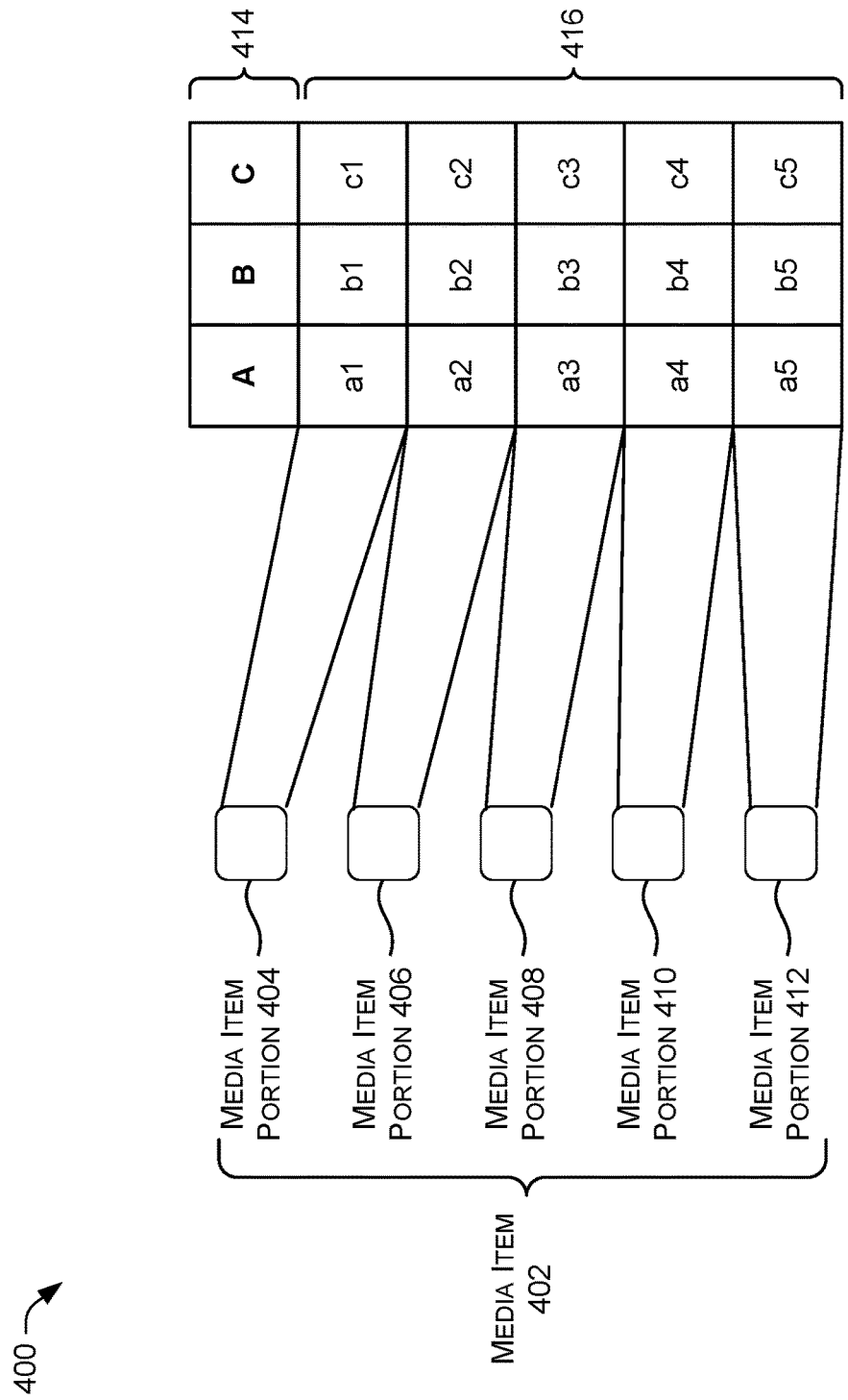
FIG. 4 is a pictorial diagram of an illustrative media item with media item portions and media item features associated with the media item portions.

FIG. 4 is a pictorial diagram 400 of a media item 402, a set of media item portions 404-412 from the media item 402, feature types 414, and features 416 extracted from the media item portions 404-412. For example, media item 402 can represent a video and media item portions 404-412 can represent frames of the video. In some instances, the media item portions 404-412 can contain more than one frame. The media item 402 can also represent an audio recording and media item portions 404-412 can represent audio clips of the audio recording. At this stage, the portion extraction component 122, for example, has operated on the media item 402. While depicted as the entire media item 402 split into media item portions 404-412, in some instances, a section or a part of the media item 402 can be split into media item portions. Additionally, at this stage, the feature detection component 124, for example, has operated on the media item portions 404-412 and has determined features 416 associated with the media item portions 404-412. The feature types 414 can be, in some instances, colors, gradients, edges, audio frequencies, and/or text. The features 416 can be the numerical representation of feature types 414 associated with a media item portion 404-412. For example, media item portion 404 can be associated with features a1, b1, and c1, which numerically represent feature types A, B, and C. In some embodiments the features 416 are representative of content depicted, or otherwise included, in the media item portions 404-412.

FIG. 5 is a pictorial diagram 500 of the media item 402, the set of media item portions 404-412, semantic feature types 502, and semantic features 504. For example, media item portion 404 is shown enlarged so as to depict an image of a person, a tree, and a house. After the feature detection component 124, for example, has operated on media item portion 404, the feature detection component 124 may determine semantic feature types 502 and semantic features 504. Semantic feature types 502 can be, in some instances, different types of semantic features, such as objects, faces, identities, and/or languages. For example, semantic feature types 502 can indicate semantic features associated with media item portion 404 where semantic feature type "sA" can be an identity semantic feature type indicating a person's name/identity, semantic feature type "sB" can be a first object semantic feature type indicating a first object, and semantic feature type "sC" can be a second object semantic feature type indicating a second object. The feature detection component 124 can determine semantic features 504 as "person" associated with the identity semantic feature type, "R tree" associated with the first object semantic feature type, where the R indicates a positional relation to a different semantic feature, and "RR house" associated with the second semantic feature type, all of which are each associated with the media item portion 404. Although depicted as only detecting semantic features for media item portion 404, the feature detection component 124 can operate similarly and determine semantic features for some or all of the remaining media item portions 406-412.

Figure 6A:
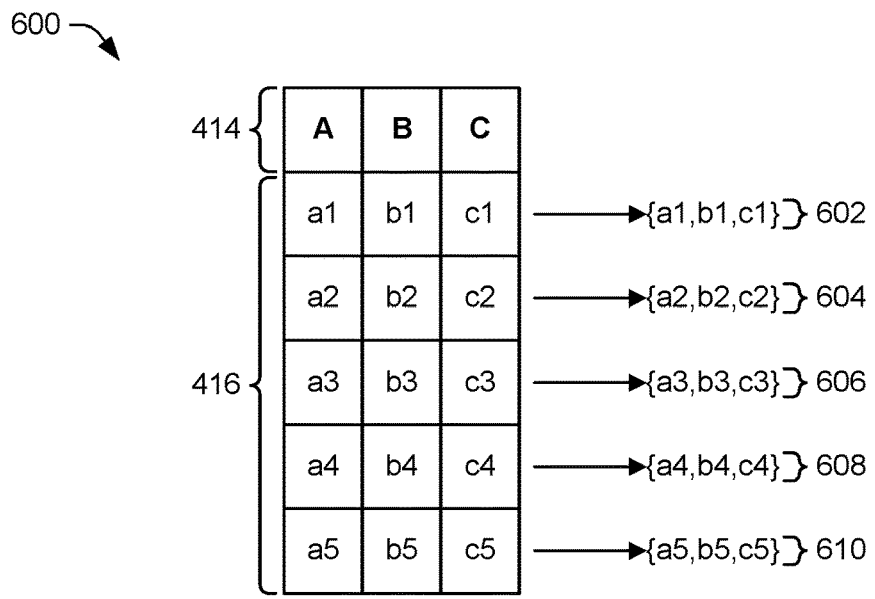
FIG. 6A is a pictorial diagram of the illustrative media item features illustrated in FIG. 4 and illustrative media item portion signatures.

FIG. 6A is a pictorial diagram 600 of the feature types 414, features 416, and media item portion signatures 602-610 associated with the features 416. At this stage, the portion signature component 128, for example, has operated and generated media item portions signatures 602-610. In some instances, the media item portion signatures 602-610 can be a concatenation of the features 416 associated with a media item portion. For example, as depicted in FIG. 4, media item portion 404 can be associated with features a1, b1, and c1. In some instances, the media item portion signature component 128 can concatenate features a1, b1, and c1 to form a media item portion signature 602 and perform similar operations to determine media item portion signatures 604-610.

Figure 6B:
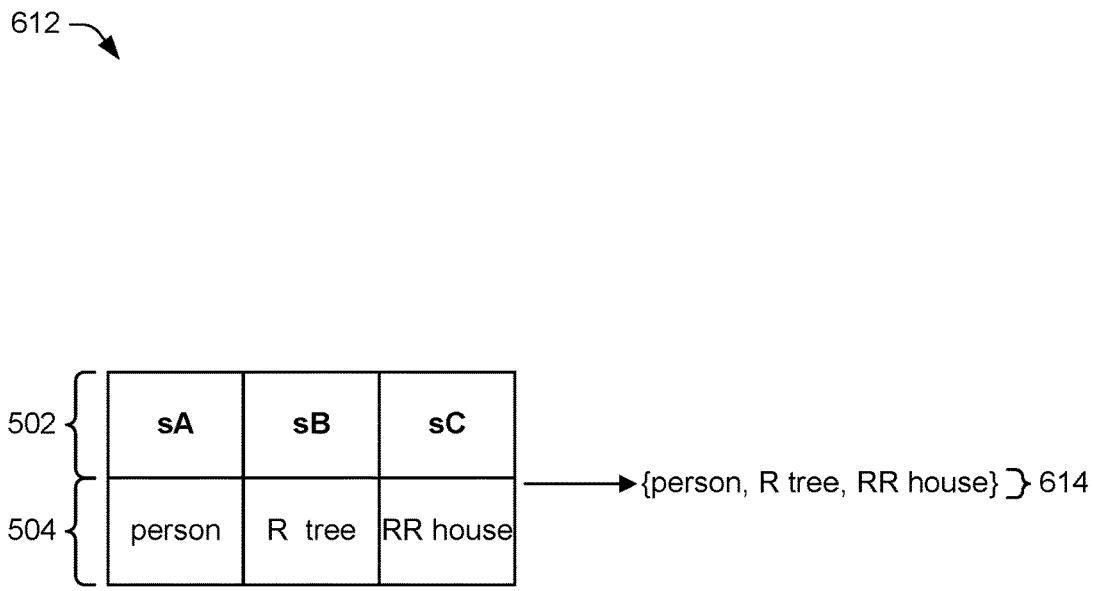
FIG. 6B is a pictorial diagram of the illustrative media item semantic features illustrated in FIG. 5 and an illustrative media item portion semantic signature.

FIG. 6B is a pictorial diagram 612 of the semantic feature types 502, semantic features 504, and a media item portion semantic signature 614. At this stage, the portion signature component 128, for example, has operated and generated the media item portion semantic signature 614. In some instances, the media item portion semantic signature 614 can be a concatenation of the semantic features 504. For example, as depicted in FIG. 5, media item portion 404 can be associated with semantic features "person," "R tree," and "RR house." In some instances, the media item portion signature component 128 can concatenate semantic features "person," "R tree," and "RR house" to form a media item portion semantic signature 614. Therefore, the media item portion semantic signature 614 can indicate, for example, that media item portion 404 contains a person within a certain distance to a tree object and where the tree object is a certain distance farther from a house object. Although depicted as only generating a media item portion semantic signature for media item portion 404, the feature detection component 124 can operate similarly and determine media item portion semantic signatures for media item portions 406-412.

Figure 6C:
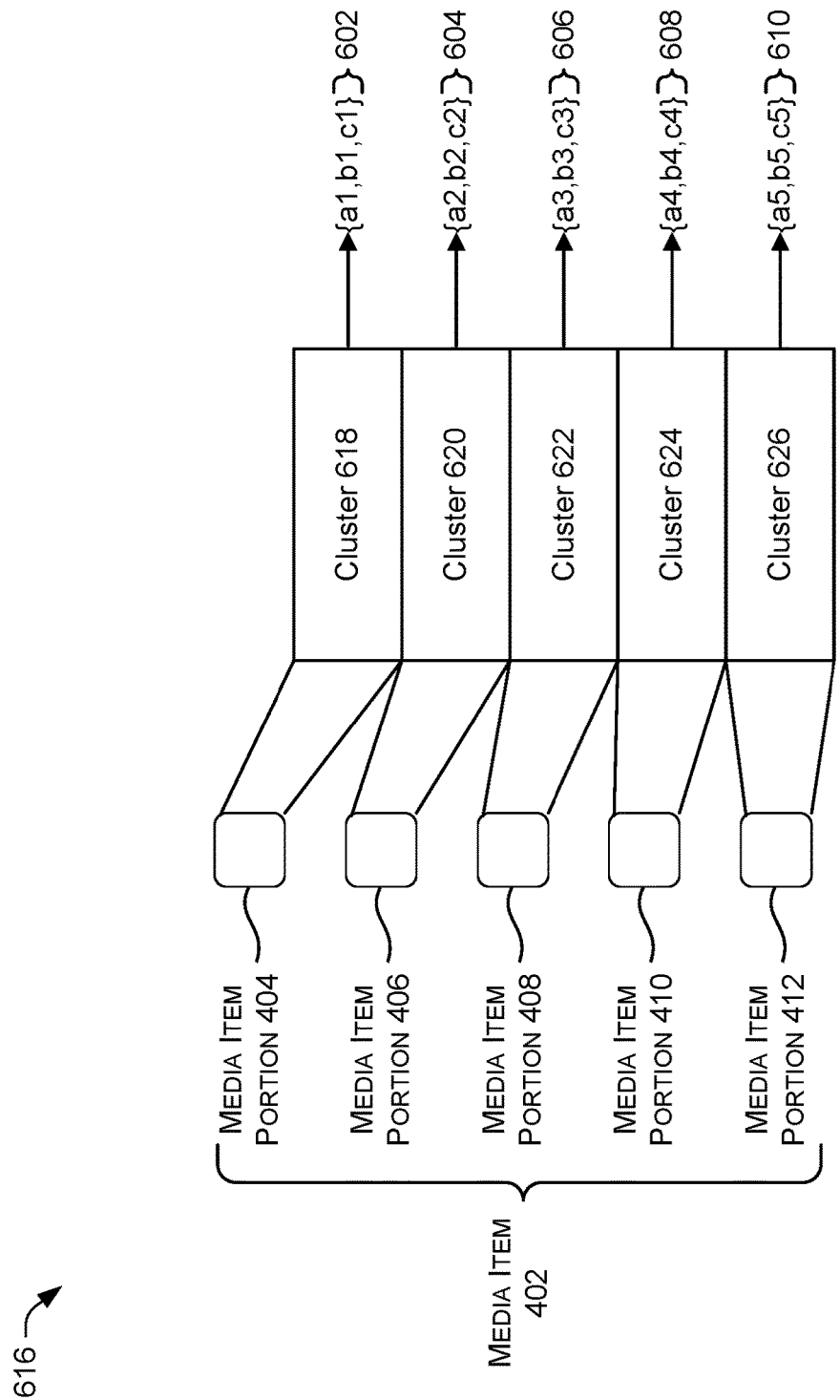
FIG. 6C is a pictorial diagram of the illustrative media item features illustrated in FIG. 4 and illustrative media item portion signatures using clusters.

FIG. 6C is a pictorial diagram 616 of the media item 402, the set of media item portions 404-412 from the media item 402, and clusters 618-626. The clustering component 130 can determine clusters 618-626 and associate media item portions 404-412 with clusters 618-626. After associating the media item portions 404-412 with the clusters 618-626, the clustering component 130 can use the media item portion signatures 602-610 associated with the clusters 628-626 to determine the media item portion signatures for the media item portion 404-412. Although depicted as resulting in the same media item portion signatures 602-610 as in FIG. 6B, the use of clusters can result in the same media item portion signatures or different media item portion signatures as other techniques.

In some instances, the media item portion signatures can include only low-level features (e.g., features), only include high-level features (e.g., semantic features), or a combination of both.

Figure 7A:
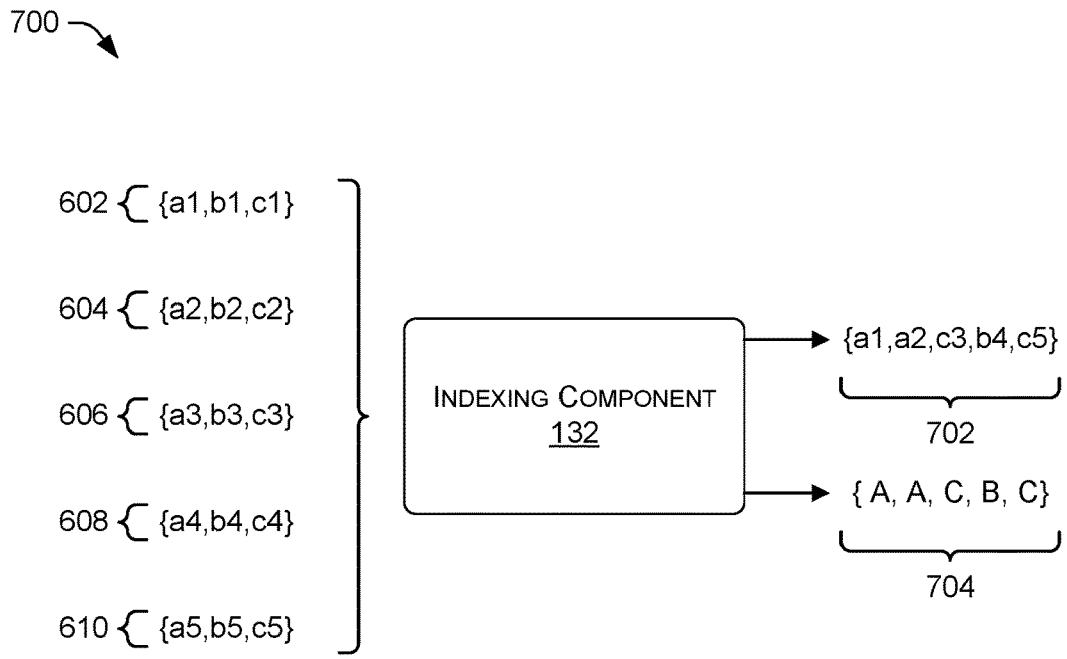
FIGS. 7A and 7B are pictorial diagrams of the illustrative media item portion signatures illustrated in FIG. 6A and an illustrative media item signature.

FIG. 7A is a pictorial diagram 700 of the media item portion signatures 602-610, the indexing component 134, a media item signature 702, and a media item signature 704. As discussed above, a media item signature 702 can be generated using the media item portion signatures 602-610 and the indexing component 134. For example, the indexing component 134 can determine a set of features from the media item portion signatures 602-610. The indexing component 134 can select a feature from some or all of the media item portions signatures 602-610. For example, the indexing component 134 can select features so that each media item portion signature is associated with at most one feature in the media item signature 702 to generate the media item signature 702. In some instances, the indexing component 134 can select features that have the highest or maximum value of a media item portion signature. In some instances, the indexing component 134 can select features that have a high value that meets or exceeds a feature threshold. As discussed above, the indexing component can also select the feature types 414 associated with the features with the maximum value or the high value that meets or exceeds a feature threshold from the media item portion signatures 602-610 to generate the media item signature 704.

Figure 7B:
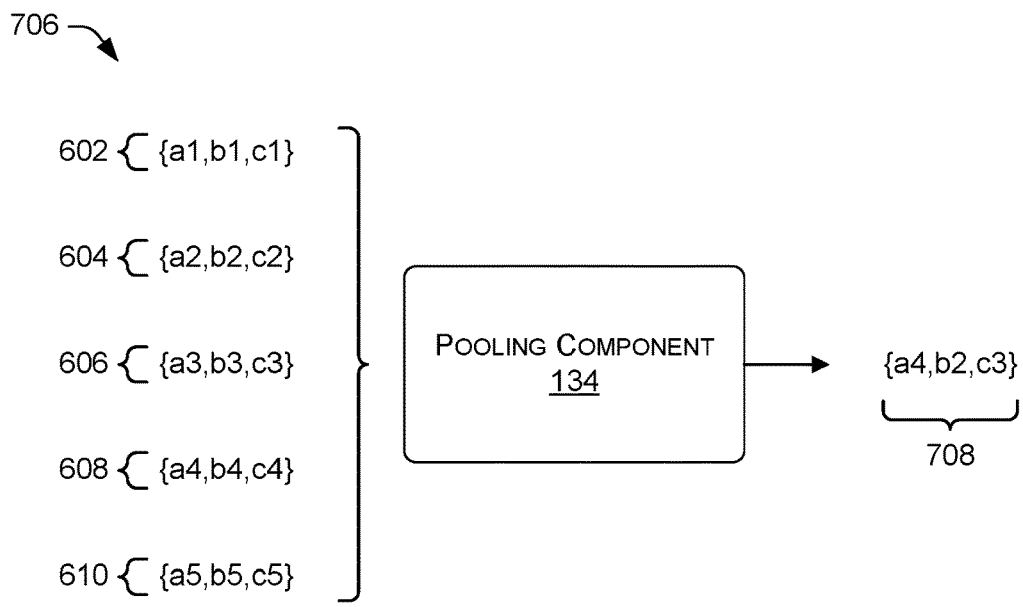

FIG. 7B is a pictorial diagram 706 of the media item portion signatures 602-610, the pooling component 136, and a media item signature 708. As discussed above, a media signature 708 can be generated using the media item portion signatures 602-610 and the pooling component 136. For example, the pooling component 136 can determine a set of features from the media item portion signatures 602-610. The pooling component 136 can select a feature from some or all of the media item portion signatures 602-610. For example, the pooling component 136 can select features so that each feature type is associated with at most one feature in the media item signature 708 to generate the media item signature 708. In some instances, the pooling component 136 can select features that have the highest or maximum value for a feature type. In some instances, the pooling component 136 can select features that have a high value that meets or exceeds a feature threshold for the feature type.

The media item signatures 702 and 708 can represent a compressed or compact media item signature. For example, as discussed above, the media item signature can be determined by concatenating all of the media item portion signatures 602-604 without the use of the indexing component 134 or the pooling component 136 (e.g., {{a1,b1,c1}, {a2,b2,c2},{a3,b3,c3},{a4,b4,c4},{a5,b5,c5}}). In some instances, concatenating all of the media item portion signatures 602-604 can result in a media item signature that is too large and/or requires more computing resources (e.g., processing resources, power resources, storage resources, network resources). Therefore, in some instances, the indexing component 134 and/or the pooling component 136 can be used to determine a denser media item signature 702 and/or 708. In some instances, multiple types of media item signatures can be determined and used to determine duplicate content.

While pictorial diagrams 700 and 706 depict the media item portion signatures 602-610 determined from features 416, the indexing component 134 and the pooling component 136 can operate similarly on media item portion semantic signatures.

FIG. 8A is pictorial diagram 800 of a first media item signature 702 and a second media item signature 802. At this stage, the comparison component 138, for example, has operated and, as discussed above, the comparison component 138 can determine duplicate content 804 based on the comparison. FIG. 8A also depicts a first media item signature 806 and a second media item signature 808. The media item signatures 806 and 808 are similar to media item signatures 702 and 802 but have a slightly different ordering of features. Similarly, at this stage, the comparison component 138, for example, has operated and, as discussed above, the comparison component 138 can determine duplicate content 810 based on the comparison. For example, first media item signature 806 can be associated with a video recording where an initial part of the video recording is of original content and a later part of the video recording is of a film that is associated with a different content producer. Therefore, even though the position of the duplicate content is not identical or similar, the comparison component 138 can still identify the duplicate content 810. In some instances, the comparison component 138 can determine duplicate content based on a comparison of feature types within the media item portion signature. While not depicted and for purposes of illustration only, the comparison component can compare a media item signature 704 as depicted in FIG. 7A that contains feature types in addition to, or in contrast with, comparing media item signatures that contain numerical values representing features.

FIG. 8B is a pictorial diagram 812 of a first media item semantic signature 814 associated with a first media item and a second media item semantic signature 816 associated with a second media item. For example, first media item semantic signature 814 contains a personA within a certain distance of personB, where personB is a certain distance farther from a tree object which is a certain distance farther from a house object. The second media item semantic signature 816 contains a person A within a certain distance of person B, where personB is a certain distance from a tree object which is a certain distance from a house object. Therefore, first media item semantic signature 814 and second media item semantic signature 816 differ in the determined distances between personB and the tree object as well as between the tree object and the house object.

At this stage, the comparison component 138, for example, has operated and, as discussed above, the comparison component 138 can determine duplicate content 818 based on the comparison and therefore the portion of the first media item and the second media item that corresponds to content 818 can be identified as the duplicate content. In some instances, content 820 can be identified as duplicate content based on a similarity threshold. For example, if the similarity threshold is configured to be at an identical level, then content 818 can be determined to be duplicate content between the first media item and the second media item and content 820 can be determined to be differing content. In some instances, if the similarity threshold is configured to be at lower level, then content 818 can be determined to be duplicate content as well as content 820. While media item semantic signatures 814 and 816 are depicted as only containing a small number of semantic signatures, a media item semantic signature can include a large number of semantic signatures. For purposes of illustration only, a media item can be a film with a runtime of two hours. The portion extraction component 122 can extract one frame per second of film resulting in 7,200 frames. Each frame can contain three semantic features and therefore, a media item semantic signature can include, for example, 21,600 semantic features.

Figure 9:
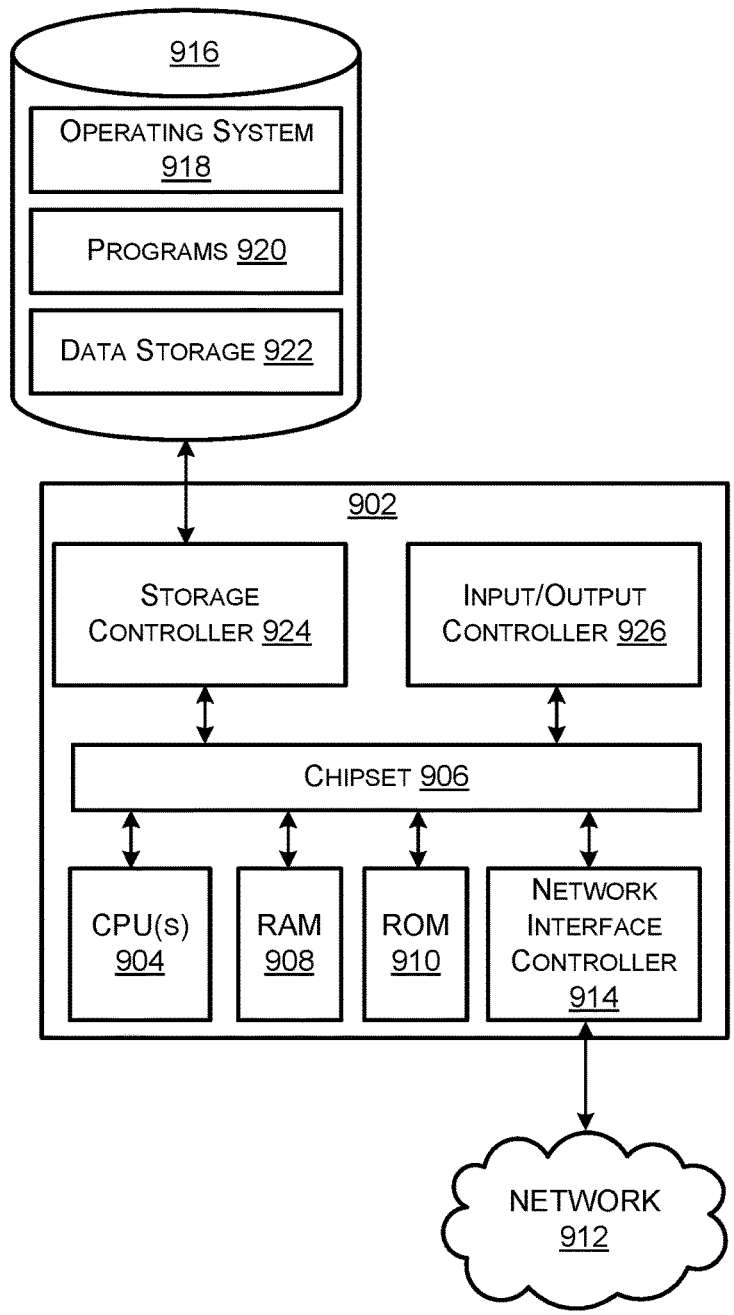
FIG. 9 is a computer architecture diagram showing an illustrative computer hardware architecture for implementing a computing device that can be utilized to implement aspects of the various technologies presented herein.

FIG. 9 is an example computer architecture for a computer 900 capable of executing program components for implementing the functionality described above. The computer architecture shown in FIG. 9 illustrates a conventional server computer, workstation, desktop computer, laptop computer, tablet computer, network appliance, eBook reader device, smartphone, wearable device, gaming console, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 912. The chipset 906 can include functionality for providing network connectivity through a network interface controller (NIC) 914, such as a gigabit Ethernet adapter. The NIC 914 is capable of connecting the computer 900 to other computing devices over the network 912. It should be appreciated that multiple NICs 914 can be present in the computer 900, connecting the computer to other types of networks and remote computer systems.

The computer 900 can be connected to a mass storage device 916 that provides non-volatile storage for the computer. The mass storage device 916 can store an operating system 918, programs 920, and data storage 922, which have been described in greater detail herein. The mass storage device 916 can be connected to the computer 900 through a storage controller 924 connected to the chipset 906. The mass storage device 916 can consist of one or more physical storage units. The storage controller 924 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 916 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 916 is characterized as primary or secondary storage, and the like.

For example, the computer 900 can store information to the mass storage device 916 by issuing instructions through the storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 916 by detecting the physical states or characteristics of one or more particular locations within the physical storage units.

In addition to the mass storage device 916 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 916 can store an operating system 918 utilized to control the operation of the computer 900. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 916 can store other system or application programs and data utilized by the computer 900.

In one configuration, the mass storage device 916 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above. The computer 900 can also include computer-readable storage media for performing any of the other computer-implemented operations described herein.

The computer 900 can also include one or more input/output controllers 926 for receiving and processing input from a number of input devices, such as a keyboard, a mouse, a touchpad, a touch screen, an electronic stylus, or other type of input device. Similarly, an input/output controller 926 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and
   one or more computer-readable media storing computer-executable instructions that, when executed, cause the one or more processors to perform operations comprising:
   receiving, from a video database, a first video;
   extracting, from the first video, a plurality of frames;
   determining a set of feature types that comprise at least one of a color feature type, an object feature type, an audio frequency feature type, or a text feature type;
   determining a plurality of features, wherein a first feature of the plurality of features is associated with a first frame of the plurality of frames and comprises at least one of a color feature associated with the color feature type, an object feature associated with the object feature type, an audio frequency feature associated with the audio frequency feature type, or a text feature associated with the text feature type;
   determining that a second feature of the plurality of features is associated with a second frame of the plurality of frames and comprises a semantic feature associated with a first semantic feature type, a positional relation, and a second semantic feature type, wherein the positional relation indicates a first position of the first semantic feature type relative to a second position of the second semantic feature type within the second frame, wherein the first semantic feature type indicates a first object or face and the second semantic feature type indicates a second object or face, wherein the positional relation indicates the first object or face is to a left or right of the second object or face;
   generating a plurality of frame signatures by concatenating a set of features of the plurality of features associated with an individual frame of the plurality of frames, wherein each frame signature of the plurality of frame signatures is associated with the individual frame;
   generating, based on the plurality of frame signatures, a first video signature associated with the first video;
   receiving, from a video signature database, a second video signature associated with a second video;
   comparing the first video signature with the second video signature to determine a similarity value;
   determining that the similarity value is equal to or greater than a similarity threshold value;
   identifying, based on the similarity value being equal to or greater than the similarity threshold value, duplicate content with respect to the first video and the second video; and
   associating an indication of the duplicate content with the first video.

2. The system as recited in claim 1, wherein generating the first video signature comprises:
   determining a set of maximum features by determining a highest numerical value feature among the set of features, the set of features associated with the individual frame of the plurality of frames; and
   generating the first video signature by concatenating the set of maximum features.

3. The system as recited in claim 1, wherein generating the first video signature comprises:
   determining a set of maximum feature types by determining a highest numerical value feature type of the plurality of features, wherein each maximum feature type of the set of maximum feature types is associated with a feature type of the set of feature types; and
   generating the first video signature by concatenating the set of maximum feature types.

4. The system as recited in claim 1, wherein the set of feature types further comprises at least one of a facial feature type, or an identity feature type, and wherein the plurality of features further comprise at least one of a facial feature associated with the facial feature type or an identity feature associated with the identity feature type.

5. The system as recited in claim 4, wherein the operations further comprise:
   accessing, from an identity data database, reference identity data that associates a name with image data; and
   generating, based on a comparison between the facial feature and a portion of the reference identity data, the identity feature.

6. A method comprising:
   determining, from a first media item, one or more media item portions;
   determining, from the one or more media item portions, one or more features, wherein a feature of the one or more features is associated with a media item portion of the one or more media item portions;
   determining, based at least in part on the one or more features, one or more media item portion signatures, wherein a media item portion signature of the one or more media item portion signatures is associated with an individual media item portion of the one or more media item portions;
   determining, based at least in part on the one or more features, one or more semantic features is associated with the media item portion signature and includes a first semantic feature type, a positional relation, and a second semantic feature type, the positional relation indicating a first position of the first semantic feature type relative to a second position of the second semantic feature type within the media item portion signature, the first semantic feature type indicates a first object or face and the second semantic feature type indicates a second object or face, wherein the positional relation indicates the first object or face is within a distance of the second object or face;
   determining that the one or more media item portion signatures include one or more semantic signatures, the one or more semantic signatures generated based on concatenating a set of the one or more semantic features;
   determining, based at least in part on the one or more media item portion signatures, a first media item signature;
   determining a second media item signature associated with a second media item; and
   determining, based at least in part on the first media item signature and the second media item signature, duplicate content with respect to the first media item and the second media item.

7. The method as recited in claim 6, wherein determining the one or more media item portions comprises determining at least two media item portions, wherein determining one or more features comprises determining at least two features, and wherein generating the first media item signature comprises:

comparing a first feature of the at least two features to a second feature of the at least two features to determine one or more high value features, the one or more high value features indicating a numerical value greater than a feature threshold value;

determining that a high value feature of the one or more high value features is associated with at least one of a single media item portion of the one or more media item portions or a feature type, the feature type indicating at least one of an object feature type, an audio frequency feature type, or a text feature type; and generating, based at least in part on the one or more high value features, the first media item signature.

8. The method as recited in claim 6, wherein the one or more media item portion signatures are one or more first media item portion signatures and the second media item signature comprises one or more second media item portion signatures, and wherein determining the duplicate content comprises:

comparing the one or more first media item portion signatures and the one or more second media item portion signatures to determine a similarity value;

determining that the similarity value is equal to or greater than a similarity value threshold; and identifying, based at least in part on the similarity value being equal to or greater than the similarity value threshold, one or more shared media item portion signatures with respect to the one or more first media item portion signatures and the one or more second media item portion signatures.

9. The method as recited in claim 6, further comprising:
determining a first semantic signature associated with the first media item;
determining, from a media item signature database, a second semantic signature associated with the second media item; and
wherein determining the duplicate content is further based at least in part on comparing the first semantic signature and the second semantic signature.

10. The method as recited in claim 9, wherein the first media item is a video, and further comprising:
assigning, based at least in part on a type of the video, a signature weight that is to be applied to at least one of the first media item signature or the first semantic signature, and
wherein determining the duplicate content is further based at least in part on the signature weight.

11. The method as recited in claim 6, further comprising selecting, from a media item database and based at least in part on consumption data indicating a number of users consuming the first media item, the first media item.

12. The method as recited in claim 6, further comprising:
receiving, from a computing device associated with a user, the first media item; and
transmitting, to the computing device, data identifying the second media item.

13. The method as recited in claim 6, further comprising:
generating a notification of the duplicate content; and
transmitting a notification of the duplicate content to a content provider associated with the first media item.

14. A system comprising:
one or more processors; and
one or more computer-readable media storing computer-executable instructions that, when executed, cause the one or more processors to perform operations comprising:

determining one or more media item portions associated with a first media item;

determining one or more features, wherein a feature of the one or more features is associated with a media item portion of the one or more media item portions;

determining that the one or more features include one or more semantic features, wherein the one or more semantic features is associated with the media item portion and includes a first feature, a positional relation, and a second feature, the positional relation indicating a first position of the first feature relative to a second position of the second feature within the media item portion;

determining, based at least in part on the one or more features, one or more first media item portion signatures, wherein a media item portion signature of the one or more first media item portion signatures is associated with an individual media item portion of the one or more media item portions;

determining one or more second media item portion signatures associated with a second media item;

comparing the one or more first media item portion signatures with the one or more second media item portion signatures to determine a similarity value; and determining, based at least in part on the similarity value, similar content with respect to the first media item and the second media item.

15. The system as recited in claim 14, wherein the one or more features comprise at least one of color data, object data, audio data, text data, positional data, facial data, or identity data.

16. The system as recited in claim 14, wherein identifying the similar content comprises identifying at least one shared media item portion associated with one first media item portion signature of the one or more first media item portion signatures and one second media item portion signature of the one or more second media item portion signatures.

17. The system as recited in claim 14, the operations further comprising:
determining one or more first media item portion semantic signatures associated with the first media item by concatenating a set of the one or more semantic features;
determining one or more second media item portion semantic signatures associated with the second media item; and
wherein determining the similar content is further based at least in part on comparing at least a portion of the one or more first media item portion semantic signatures and at least a portion of the one or more second media item portion semantic signatures.

18. The system as recited in claim 17, wherein the first media item is a video, the operations further comprising:
associating, based at least in part on a type of the video, a signature weight to at least one of the one or more first media item portion signatures or at least one of the one or more second media item portion signatures, and
wherein determining the similar content is further based at least in part on the signature weight.

19. The system as recited in claim 14, the operations further comprising selecting, from a media item database and based at least in part on consumption data indicating a number of users consuming the first media item, the first media item.

20. The system as recited in claim 14, the operations further comprising:

determining that the similarity value is equal to or greater than a similarity threshold value; and wherein determining the similar content is further based at least in part on the similarity value being equal to or greater than the similarity threshold value.

* * * * *